US009585148B2

(12) United States Patent
Kim et al.

(10) Patent No.: US 9,585,148 B2
(45) Date of Patent: Feb. 28, 2017

(54) APPARATUS AND METHOD FOR OBTAINING IP ADDRESS OF TERMINAL USING MULTIPLE FREQUENCY ALLOCATIONS IN BROADBAND WIRELESS COMMUNICATION SYSTEM

(71) Applicant: Samsung Electronics Co., Ltd., Gyeonggi-do (KR)

(72) Inventors: Nam-Gi Kim, Gyeonggi-do (KR); Jae-Hee Cho, Seoul (KR); Hyoung-Kyu Lim, Seoul (KR); Min-Hee Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 418 days.

(21) Appl. No.: 13/846,275

(22) Filed: Mar. 18, 2013

(65) Prior Publication Data
US 2013/0235824 A1 Sep. 12, 2013

Related U.S. Application Data

(63) Continuation of application No. 12/053,025, filed on Mar. 21, 2008, now Pat. No. 8,400,972.

(30) Foreign Application Priority Data

Mar. 21, 2007 (KR) .............................. 2007-0027510

(51) Int. Cl.
*H04W 4/00* (2009.01)
*H04W 72/04* (2009.01)
(Continued)

(52) U.S. Cl.
CPC ... *H04W 72/0453* (2013.01); *H04L 29/12311* (2013.01); *H04L 29/12952* (2013.01); *H04L 61/2015* (2013.01); *H04L 61/2084* (2013.01); *H04L 61/6077* (2013.01); *H04W 8/26* (2013.01); *H04L 29/12839* (2013.01); *H04L 61/6022* (2013.01); *H04W 60/00* (2013.01); *H04W 80/02* (2013.01); *H04W 80/04* (2013.01)

(58) Field of Classification Search
CPC ... H04W 8/26; H04W 80/04; H04W 72/0453; H04L 2012/5632
See application file for complete search history.

(56) References Cited

U.S. PATENT DOCUMENTS 5,570,355 A 10/1996 Dail et al.
6,775,273 B1 8/2004 Kung et al.
(Continued)

FOREIGN PATENT DOCUMENTS

JP 2007006240 1/2007
KR 1020050078631 8/2005

*Primary Examiner* — Shaq Taha
(74) *Attorney, Agent, or Firm* — The Farrell Law Firm, P.C.

(57) ABSTRACT

An Internet Protocol (IP) address acquisition in a broadband wireless communication system is disclosed. A terminal includes a driver for loading one of a plurality Media Access Control (MAC) addresses for a multi-Frequency Allocation (FA) connection when the terminal is initialized; an interface for registering the loaded MAC address to use in an upper layer of a MAC layer; and a manager for acquiring an IP address using the registered MAC address when a network entry for at least one FA is complete.

8 Claims, 5 Drawing Sheets

(51) Int. Cl.
  *H04L 29/12*  (2006.01)
  *H04W 8/26*  (2009.01)
  *H04W 60/00*  (2009.01)
  *H04W 80/02*  (2009.01)
  *H04W 80/04*  (2009.01)

(56) References Cited

U.S. PATENT DOCUMENTS

| | | |
|---|---|---|
| 7,860,067 B2 | 12/2010 | Na et al. |
| 2002/0075844 A1 | 6/2002 | Hagen |
| 2003/0048794 A1* | 3/2003 | Sato ................ H04W 92/04 370/401 |
| 2003/0053484 A1 | 3/2003 | Sorenson et al. |
| 2004/0081127 A1 | 4/2004 | Gardner et al. |
| 2004/0085945 A1* | 5/2004 | Takabatake .......... H04W 28/22 370/338 |
| 2005/0089052 A1 | 4/2005 | Chen et al. |
| 2006/0039358 A1 | 2/2006 | Kim |
| 2006/0159003 A1 | 7/2006 | Nanda et al. |
| 2007/0002898 A1 | 1/2007 | Boariu et al. |
| 2007/0025246 A1 | 2/2007 | Pirzada et al. |
| 2007/0177549 A1* | 8/2007 | Lo et al. ................ 370/331 |
| 2007/0218897 A1 | 9/2007 | Yukizaki et al. |
| 2007/0230493 A1* | 10/2007 | Dravida ................ H04L 47/14 370/412 |
| 2008/0107156 A1* | 5/2008 | Wentick ................ H04B 1/713 375/134 |
| 2008/0212534 A1* | 9/2008 | Shitama et al. ............. 370/331 |
| 2008/0318609 A1* | 12/2008 | Sung .................... H04W 72/10 455/509 |
| 2014/0192776 A1* | 7/2014 | Lee et al. ................... 370/331 |

* cited by examiner

APPARATUS AND METHOD FOR OBTAINING IP ADDRESS OF TERMINAL USING MULTIPLE FREQUENCY ALLOCATIONS IN BROADBAND WIRELESS COMMUNICATION SYSTEM

PRIORITY

This application is a Continuation Application of U.S. patent application Ser. No. 12/053,025, which claims priority under 35 U.S.C. §119(a) to a Korean patent application filed in the Korean Intellectual Property Office on Mar. 21, 2007 and assigned Serial No. 2007-27510, the disclosures of which are incorporated herein by reference.

BACKGROUND OF THE INVENTION

1. Field of the Invention

The present invention relates generally to Internet Protocol (IP) address acquisition in a broadband wireless communication system. More particularly, the present invention relates to an apparatus and a method for acquiring an IP address of a terminal which communicates using multiple Frequency Allocations (FAs) in the broadband wireless communication system.

2. Description of the Related Art

A great number of wireless communication techniques have been suggested as candidates for a high-speed mobile communication. Among them, an Orthogonal Frequency Division Multiplexing (OFDM) scheme is regarded as the most dominant next-generation wireless communication technique. It is anticipated that the OFDM will be applied to most of the wireless communication techniques by the year of 2010. A Wireless Metropolitan Area Network (WMAN) of the Institute of Electrical and Electronics Engineers (IEEE) 802.16 that is called the $3.5^{th}$-generation technology also adopts the OFDM as the standard specification.

Meanwhile, wireless communication systems are advancing to servicing high-speed data or addressing various issues in the implementation process, compared to the legacy systems. In the process of this development, diverse systems may coexist in the same region according to their compatibility with the legacy systems. For example, a new advanced system can be installed in the region of an IEEE 802.16e system. In this case, the new system should be able to support the service to both of the existing terminal and the new terminal.

Through a single Frequency Allocation (FA), the current OFDM broadband wireless communication system supports only terminals which use a single bandwidth. Hence, to support a new terminal to be developed to use a wider bandwidth in the future, the FA of the system needs to be changed to a new FA of the corresponding bandwidth. However, the system of the changed FA cannot service the terminals which use the existing narrow bandwidth. In other words, when the FA of the system is changed, it is necessary to change all of the existing terminals at the same time. In this respect, in the development of the broadband wireless communication system, it is needed a method for supporting both the existing terminals using the narrow bandwidth and the new terminals using the wide bandwidth is needed.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for supporting terminals which use different bandwidths at the same time in a broadband wireless communication system.

Another aspect of the present invention is to provide an apparatus and a method for a sender and receiver pair to communicate with each other using multiple FAs (multi-FAs) at the same time in a broadband wireless communication system.

Yet another aspect of the present invention is to provide an apparatus and a method for obtaining an IP address in multi-FA communications in a broadband wireless communication system.

According to one aspect of the present invention, a terminal is provided in a wireless communication system. The terminal includes a controller configured to generate IP packets including a single IP address of the terminal and to distribute the IP packets to the plurality of FAs. The terminal also includes a first Media Access Control (MAC) processor configured to generate at least one MAC packet, including a first MAC address, from at least one IP packet distributed to a first FA. The terminal additionally includes a second MAC processors configured to generate at least one MAC packet, including a second MAC address, from at least one IP packet distributed to a second FA. The terminal further includes a plurality of communicators configured to transmit the at least one MAC packet from the first MAC processor and the second MAC processor via the first FA and second FA.

According to another aspect of the present invention, a method is provided for operating a terminal in a wireless communication system. IP packets including a single IP address of the terminal are generated and the IP packets are distributed to the plurality of FAs. At least one MAC packet, including a first MAC address, is generated from at least one IP packet distributed to a first FA. At least one MAC packet, including a second MAC address, is generated from at least one IP packet distributed to a second FA. The at least one MAC packet is transmitted from the first MAC processor and the second MAC processor via the first FA and second FA.

Other aspects, advantages, and features of the invention will become more apparent to those skilled in the art from the following detailed description, which, taken in conjunction with the annexed drawings, discloses preferred embodiments of the invention.

BRIEF DESCRIPTION OF THE DRAWINGS

The above and other aspects, features and advantages of certain preferred embodiments the present invention will become more apparent from the following detailed description taken in conjunction with the accompanying drawings, in which.

DETAILED DESCRIPTION OF PREFERRED EMBODIMENTS

The following description with reference to the accompanying drawings is provided to assist a comprehensive understanding of the preferred embodiments of the present invention as defined by the claims and their equivalents. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Preferred embodiments of the present invention provide a technique for supporting terminals which use different bandwidths at the same time in a broadband wireless communication system. Particularly, the present invention provides the technique for obtaining an Internet Protocol (IP) address in a multiple Frequency Allocation (multi-FA) connection to use a wider bandwidth. Though an Orthogonal Frequency Division Multiplexing (OFDM) wireless communication system is illustrated by way of example, the present invention is applicable to any other wireless communication systems.

FIG. 1 illustrates a bandwidth change in a broadband wireless communication system. To operate an FA of 20 MHz bandwidth in the system which operates an FA of 10 MHz bandwidth, the expected bandwidth change processes are as follows.

Figure 1A:
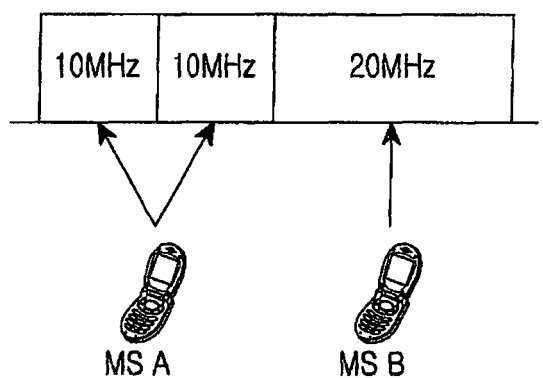
FIGS. 1A and 1B are diagrams illustrating a bandwidth change in a broadband wireless communication system.
Figure 1B:
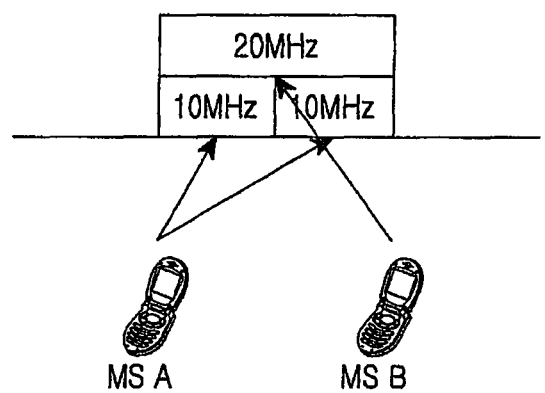

First, the FA of 10 MHz bandwidth and the FA of 20 MHz in the separate frequency band are operated at the same time as shown in FIG. 1A. Secondly, the frequency overlay operates the FA of 10 MHz together with the FA of 20 MHz which combines two FAs of 10 MHz bandwidth in the same frequency band as shown in FIG. 1B. The separate FA of FIG. 1A requires a wider bandwidth. Hence, the frequency overlay based bandwidth change of FIG. 1B is advantageous in terms of the frequency utilization. The frequency band usage and the communication protocol stack according to the frequency overlay are now described.

Figure 2:
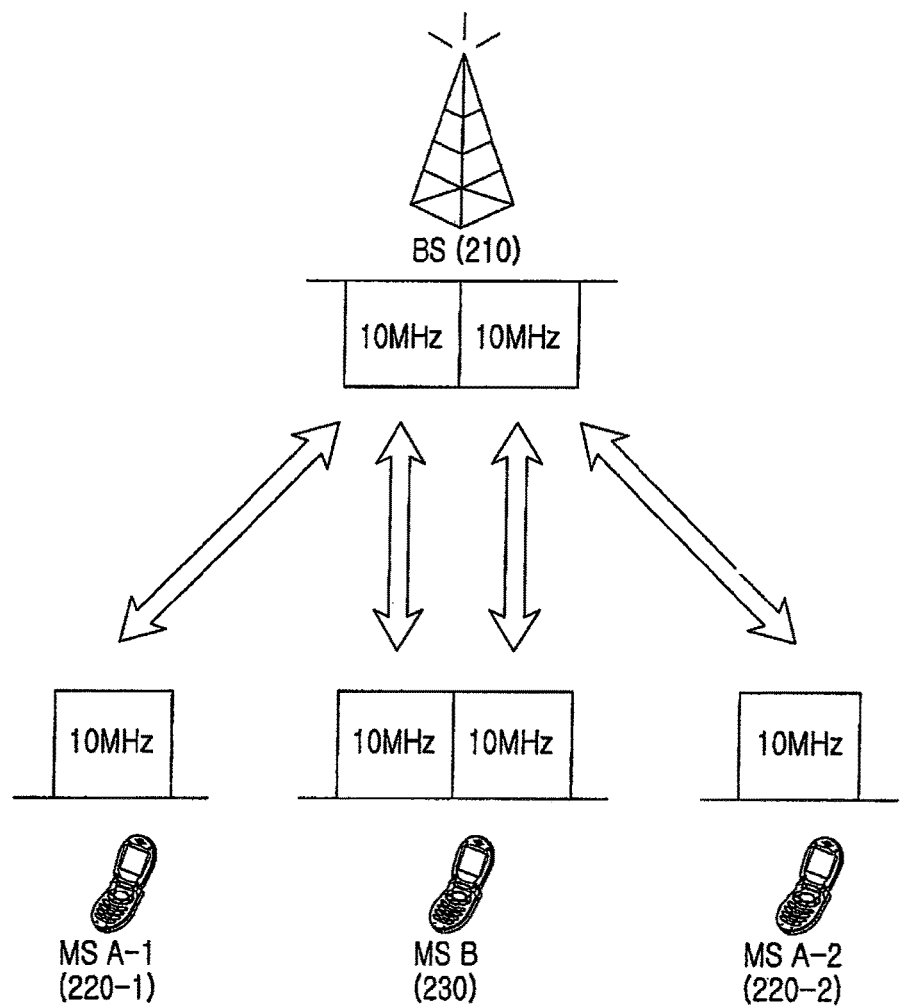
FIG. 2 is a diagram illustrating a frequency band usage in a broadband wireless communication system according to a preferred embodiment of the present invention.

FIG. 2 illustrates a frequency band usage in a broadband wireless communication system according to a preferred embodiment of the present invention. Two FA are assumed in FIG. 2 by way of example, although the system can use three or more FAs.

Referring to FIG. 2, a Base Station (BS) 210 uses two FAs of 10 MHz bandwidth. Each of the existing Mobile Stations (MS) A-1 220-1 and MS A-2 220-2 communicate with the BS 210 using only one FA of 10 MHz. Meanwhile, a new MS B 230 uses two FAs of 10 MHz bandwidth at the same time. Herein, the connection between the BS 210 and the MS B 230 is established per FA in FIG. 2. In more detail, the MS B 230 holds two connections through two FAs of 10 MHz bandwidth and uses 20 MHz bandwidth in total. As such, using a frequency overlay, the BS 210 can support both of the new MS and the existing MSs. Since the two FAs are independent of each other, the new MS B 230 can use only one FA for communications if necessary similar to the existing MSs.

To independently operate two FAs, both of the BS and the MS need to have independent MAC addresses for each FA, and to manage and operate a network entry, a context (e.g., CID, AK ID, and SA ID), and a handover signaling on the FA basis using the separate MAC addresses. With independent MAC addresses for each FA, the change of the existing standard is minimized. However, for a new MS operating on multiple FAs, an upper layer should be able to recognize that a plurality of MAC addresses refers to the single MS. Therefore, it is needed to map the plurality of the MAC addresses of one MS to a single IP address.

Figure 3:
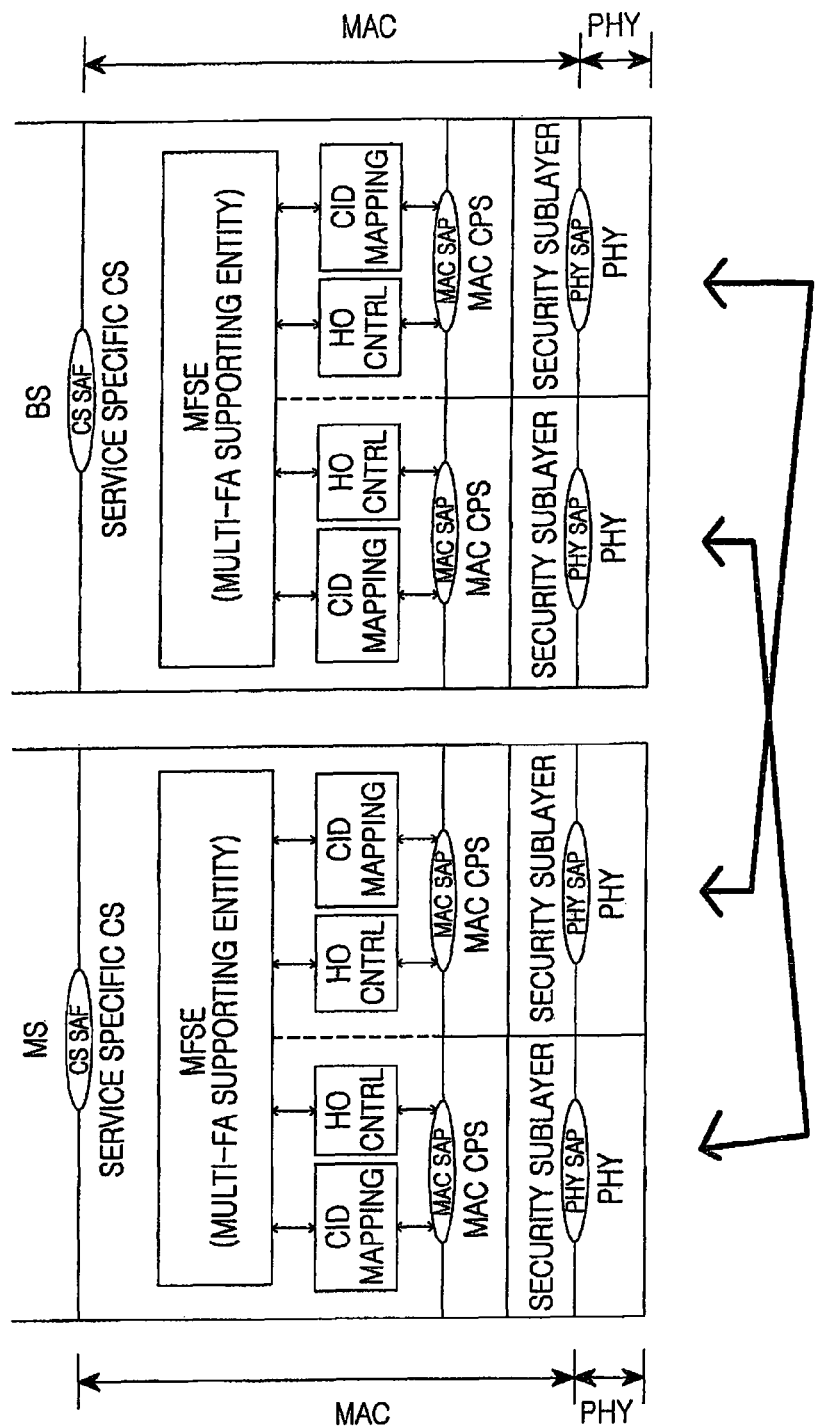
FIG. 3 is a diagram illustrating a logical protocol stack in the broadband wireless communication system according to a preferred embodiment of the present invention.

FIG. 3 illustrates a protocol stack in the broadband wireless communication system according to a preferred embodiment of the present invention.

Referring to FIG. 3, the protocol stack for supporting the multi-FA connection largely includes a PHYsical (PHY) layer and a MAC layer. The MAC layer includes a Security Sublayer (SS), a MAC Common Part Sublayer (CPS), and a Convergence Sublayer (CS). To support two FAs, two PHY layers and two MAC layers are provided. To coordinate the two FAs, the CS includes a Multi FA Supporting Entity (MFSE). Herein, the position of the MFSE is a mere example. The MFSE can be placed in other upper layer (e.g., IP layer) of the MAC layer, and in a separate layer or in a separate sublayer.

The CS converts a service protocol, such as digital audio/video multicast protocol, digital telephony protocol, and Internet access protocol, in conformity to the MAC protocol. The CS converts an IP packet to a MAC Service Data Unit (SDU) having a corresponding Connection ID (CID) and provides the MAC SDU to the MAC CPS. Conversely, the CS converts a MAC SDU received from the MAC CPS to an IP packet and provides the IP packet to the upper layer.

The MAC CPS controls the access to the shared radio medium and the flow of data and control signal according to a prescribed MAC protocol. Also, the MAC CPS generates a MAC Protocol Data Unit (PDU) and a burst with MAC SDUs received from the CS and provides the MAC PDU and the burst to the lower layer. Conversely, the MAC CPS extracts MAC SDUs from data received from the lower layer and provides the extracted MAC SDUs to the CS.

The SS performs security related functions, such as authentication, encryption and key management. The PHY layer converts the burst generated at the MAC CPS to a transmittable signal. The PHY layer also converts a signal received in a radio link to data and provides the data to the upper layer.

The MFSE controls a multi-FA capability negotiation to check whether the multi-FA is supported between the MS and the BS. The MFSE distributes packets received from the upper layer to the FAs and aggregates packets from the lower layer to one IP. When the MFSE is present in the MAC CPS, the packets can be distributed using an IP fragmentation function. In the handover, the MFSE controls to hand the multiple FAs connected to the same MS over to the same target BS.

Since the layers below the MAC CPS are independent based on the FA as shown in FIG. 3, the terminal also has independent MAC addresses based on the FAs. Thus, one terminal has a plurality of MAC addresses. Accordingly, for the upper layer of the MAC layer to recognize the terminal as a single entity, the terminal sets one of the MAC addresses as a default MAC address. After entering a network for each FA, the terminal acquires an IP address based on the default MAC address. In this situation, it is possible to prevent the terminal from obtaining different IP addresses based on the FAs, that is, from obtaining a plurality of IP addresses. To guarantee the reliability in the FA-based connection, authentication and encryption are independently performed for each FA.

Hereafter, a structure and operations of the terminal for obtaining the IP address using the multiple FAs are explained in detail by referring to the drawings.

Figure 4:
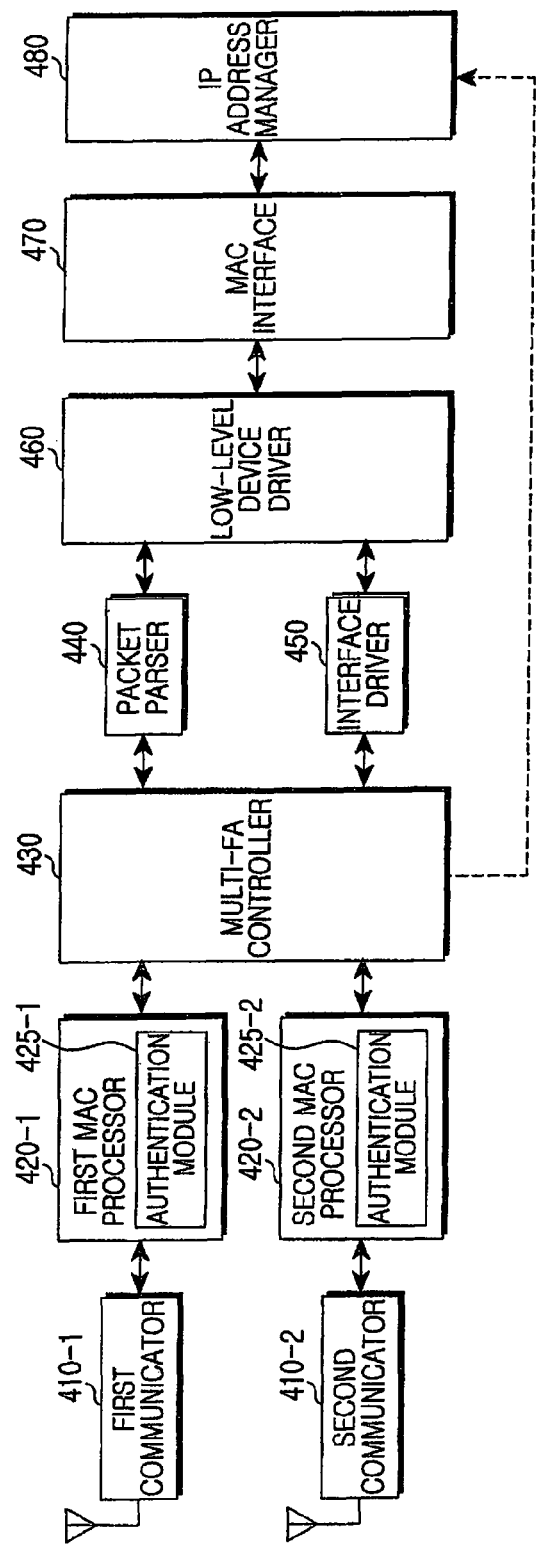
FIG. 4 is a block diagram illustrating a terminal in the broadband wireless communication system according to a preferred embodiment of the present invention.

FIG. 4 is a block diagram of the terminal in the broadband wireless communication system according to a preferred embodiment of the present invention.

Referring to FIG. 4, the terminal includes a first communicator 410-1, a second communicator 410-2, a first MAC processor 420-1, a second MAC processor 420-2, a multi-FA controller 430, a packet parser 440, an interface driver 450, a low-level device driver 460, a MAC interface 470 and an IP address manager 480.

The first communicator 410-1 and the second communicator 410-2 convert a signal received on an antenna to a bit stream and provide the bit stream to the first MAC processor 420-1 and the second MAC processor 420-2, and convert the bit stream provided from the first MAC processor 420-1 and the second MAC processor 420-2 to a physical signal and transmit the physical signal over the antenna. In more detail, to transmit data to the BS, the first communicator 410-1 and the second communicator 410-2 convert the input bit stream to complex symbols by channel-coding and modulating the bit stream, and generate OFDM symbols through an Inverse Fast Fourier Transform (IFFT) operation. Also, the first communicator 410-1 and the second communicator 410-2 up-convert the OFDM symbols to a frequency band of the corresponding FA and transmit the symbols over the antennas.

To receive data from the BS, the first communicator 410-1 and the second communicator 410-2 acquire the signal of the frequency band of the corresponding FA by filtering the signal received on the antennas. Next, the first communicator 410-1 and the second communicator 410-2 classify the acquired signal by the OFDM symbol, recover the complex symbols through a Fast Fourier Transform (FFT) operation, demodulate and decode the complex symbols, and provide the acquired bit stream to the first MAC processor 420-1 and the second MAC processor 420-2 respectively.

The first MAC processor 420-1 and the second MAC processor 420-2 perform a MAC layer function to communicate through the corresponding FA of the multiple FAs under the control of the multi-FA controller 430. More specifically, the first MAC processor 420-1 and the second MAC processor 420-2 insert an MAC header and an error correcting code into the packet provided from the upper layer, and perform the signaling for the corresponding FA. Authentication modules 425-1 and 425-2 in the first MAC processor 420-1 and the second MAC processor 420-2 conduct user authentication and encryption when entering the network. For example, the authentication modules 425-1 and 425-2 perform the authentication and the encryption according to an Extensible Authentication Protocol (EAP) standard.

The multi-FA controller 430 coordinates the supported FAs. In more detail, the multi-FA controller 430 selects a FA to use and determines the number of FAs to use for the communication. To transmit a MAC Service Data Unit (SDU) provided from the upper layer, the multi-FA controller 430 fragmentizes the MAC SDU and distributes the fragments to the first MAC processor 420-1 and the second MAC processor 420-2 according to a prescribed rule. The multi-FA controller 430 maps the receive packets provided from the first MAC processor 420-1 and the second MAC processor 420-2 to a single IP address and provides the packets to the upper layer. The multi-FA controller 430 also controls the first MAC processor 420-1 and the second MAC processor 420-2 to not communicate in the same band.

The packet parser 440 parses the packets exchanged between the multi-FA controller 430 and the low-level device driver 460 according to the processing scheme. When the terminal is initialized, that is, when the terminal is powered on, the interface driver 450 loads the MAC address set as the default MAC address of the MAC addresses of the first MAC processor 420-1 and the second MAC processor 420-2.

The low-level device driver 460 sends and receives information from a host stage to a modem stage. In this embodiment of the present invention, when the terminal is initialized, the low-level device driver 460 receives the default MAC address from the interface driver 450 and provides the default MAC address to the MAC interface 470.

The MAC interface 470 so operates that the upper layer of the MAC layer can function independently of the structure of the MAC layer. For example, the MAC interface 470 conforms to a Network Driver Interface Specification (NDIS). In this embodiment of the present invention, the MAC interface 470 registers the default MAC address provided through the low-level device driver 460 as the MAC address to be used in the upper layer. Hence, the upper layer of the MAC layer recognizes the terminal using the MAC address registered to the MAC interface 470.

The IP address manager 480 acquires the IP address using the MAC address of the terminal. For example, the IP address manager 480 acquires the IP address according to a Dynamic Host Configuration Protocol (DHCP) or a mobile IP protocol. To acquire the IP address, the IP address manager 480 uses the default MAC address registered to the MAC interface 470.

Figure 5:
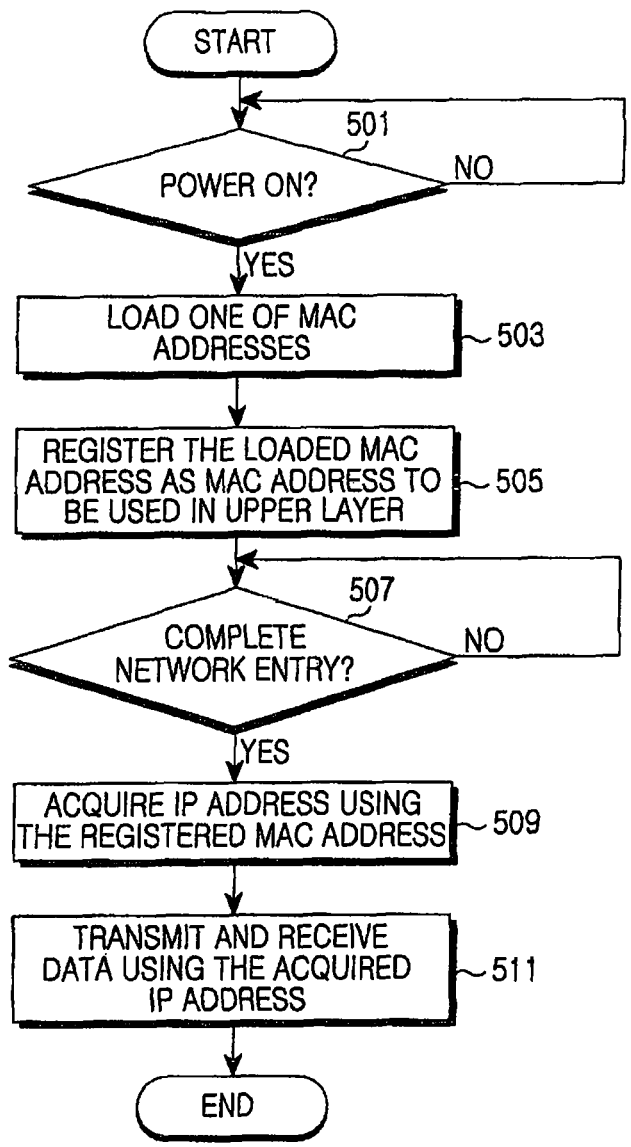
FIG. 5 is a flow chart illustrating an IP address acquiring method of the terminal in the broadband wireless communication system according to a preferred embodiment of the present invention.

FIG. 5 illustrates an IP address acquiring method of the terminal in the broadband wireless communication system according to a preferred embodiment of the present invention.

Referring to FIG. 5, in step 501, the terminal checks whether the power is on. When the power is on, the terminal loads one address set as the default MAC address among the MAC addresses based on the FAs in step 503.

In step 505, the terminal registers the loaded default MAC address as the MAC address to be used in the upper layer of the MAC layer. Herein, the MAC address registration is one of the interface operation between the MAC layer and the upper layer according to the NDIS.

In step 507, the terminal checks whether the network entry for at least one FA is complete. In the network entry, the authentication and the encryption are independently performed for each FA.

When the network entry is complete, the terminal acquires the IP address using the registered MAC address. The IP address acquisition complies with the DHCP or the mobile IP protocol.

In step 511, the terminal transmits and receives data using the acquired IP address. That is, to transmit data, the terminal distributes packets generated using the IP address to a plurality of FAs, performs a MAC layer processing on the classified packets on the FA basis and transmits the packets through FAs.

As set forth above, the broadband wireless communication system sets the default MAC address in the multi-FA connection. Therefore, the FAs can be independently operated using the plurality of the MAC addresses as a single terminal using one IP address at the same time.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A terminal in a wireless communication system, the terminal comprising:
   a transceiver; and
   at least one processor coupled to the transceiver,
   wherein the at least one processor is configured to:
   generate an internet protocol (IP) address of the terminal based on a first media access control (MAC) address among a plurality of MAC addresses respectively allocated for a plurality of frequency bands;
   generate IP packets in which the IP address is included;
   generate, based on a first subset of the IP packets, first MAC packets in which the first MAC address is included;
   generate, based on a second subset of the IP packets, second MAC packets in which a second MAC address among the plurality of MAC addresses is included; and
   control to transmit the first MAC packets on a first frequency band among the plurality of frequency bands and the second MAC packets on a second frequency band among the plurality of frequency bands.

2. The terminal of claim 1, further comprising:
   a driver configured to load one of the plurality of MAC addresses of the terminal for the plurality of frequency bands when the terminal is initialized;
   an interface configured to register the loaded MAC address to use in an upper layer of a MAC layer;
   a manager configured to acquire the IP address for the plurality of MAC addresses of the terminal using the registered MAC address, when a network entry for the plurality of frequency bands is completed.

3. The terminal of claim 2, wherein the one MAC address is preset as a default MAC address, and
   wherein the first MAC address is the one MAC address.

4. The terminal of claim 2, further comprising:
   a plurality of authentication modules for performing a user authentication and an encryption for a corresponding frequency band in the network entry.

5. A method for operating a terminal in a wireless communication system, the method comprising:
   generating an internet protocol (IP) address of the terminal based on a first media access control (MAC) address among a plurality of MAC addresses respectively allocated for a plurality of frequeny band;
   generating IP packets in which the IP address is included;
   generating, based on a first subset of the IP packets, first MAC packets in which the first MAC address is included;
   generating, based on a second subset of the IP packets, second MAC packets in which a second MAC address among the plurality of MAC addresses is included; and
   transmitting the first MAC packets on a first frequency band and the second MAC packets on a second frequency band.

6. The method of claim 5, further comprising:
   loading one of the plurality of MAC addresses of the terminal for the plurality of frequency bands when the terminal is initialized;
   registering the loaded MAC address to use in an upper layer of a MAC layer;
   acquiring the IP address for the plurality of MAC addresses of the terminal using the registered MAC address, when a network entry for the plurality of frequency bands is completed.

7. The method of claim 6, wherein the one MAC address is preset as a default MAC address, and
   wherein the first MAC address is the one MAC address.

8. The method of claim 6, further comprising:
   performing a user authentication and an encryption for a corresponding frequency band in the network entry.

* * * * *